United States Patent [19]

Ando et al.

[11] 4,318,793

[45] Mar. 9, 1982

[54] AUTOMATIC PLATING APPARATUS

[75] Inventors: Masato Ando, Yokohama; Kenji Yamamoto, Komae; Kazuhiro Taniguchi, Hiratsuka, all of Japan

[73] Assignee: Electroplating Engineers of Japan, Limited, Tokyo, Japan

[21] Appl. No.: 142,524

[22] Filed: Apr. 21, 1980

[30] Foreign Application Priority Data

Dec. 29, 1979 [JP] Japan ................................ 54/172186

[51] Int. Cl.³ ...................... C25D 17/28; C25D 17/06
[52] U.S. Cl. ..................................................... 204/198
[58] Field of Search .......................... 209/63; 118/423; 204/198–205

[56] References Cited

U.S. PATENT DOCUMENTS 1,950,096  3/1934  Yeager ................................ 204/202
2,350,496  6/1944  Davis ............................. 204/203 X
2,445,675  7/1948  Lang ................................... 204/209
2,738,321  3/1956  Finston ............................... 204/203

FOREIGN PATENT DOCUMENTS 863276  1/1953  Fed. Rep. of Germany ...... 204/202

Primary Examiner—F. Edmundson
Attorney, Agent, or Firm—Blanchard, Flynn, Thiel, Boutell & Tanis

[57] ABSTRACT

In an automatic apparatus for plating, the plating assembly line is incorporated into a circuit assuming a rectangle in a plan view, and on said assembly line a plurality of support carriages carrying objects to be plated are successively conveyed to effectively carry out the desired processings of plating in different plating tanks, the objects being a plurality of strips and aligned and carried by said support carriage.

6 Claims, 22 Drawing Figures

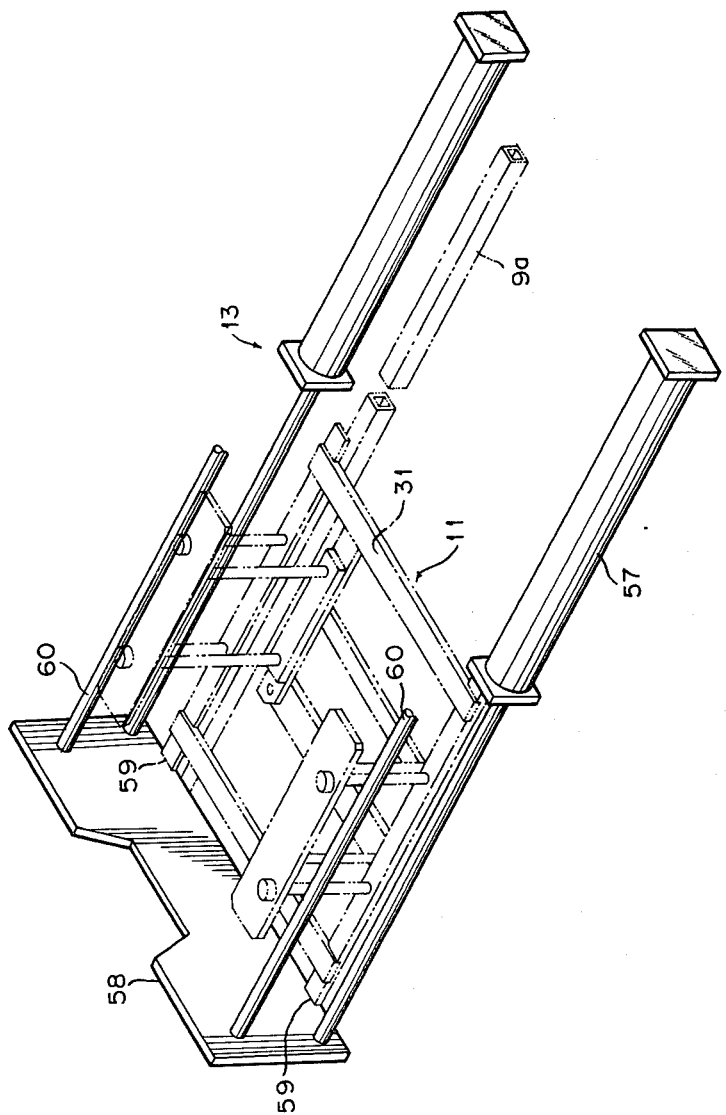

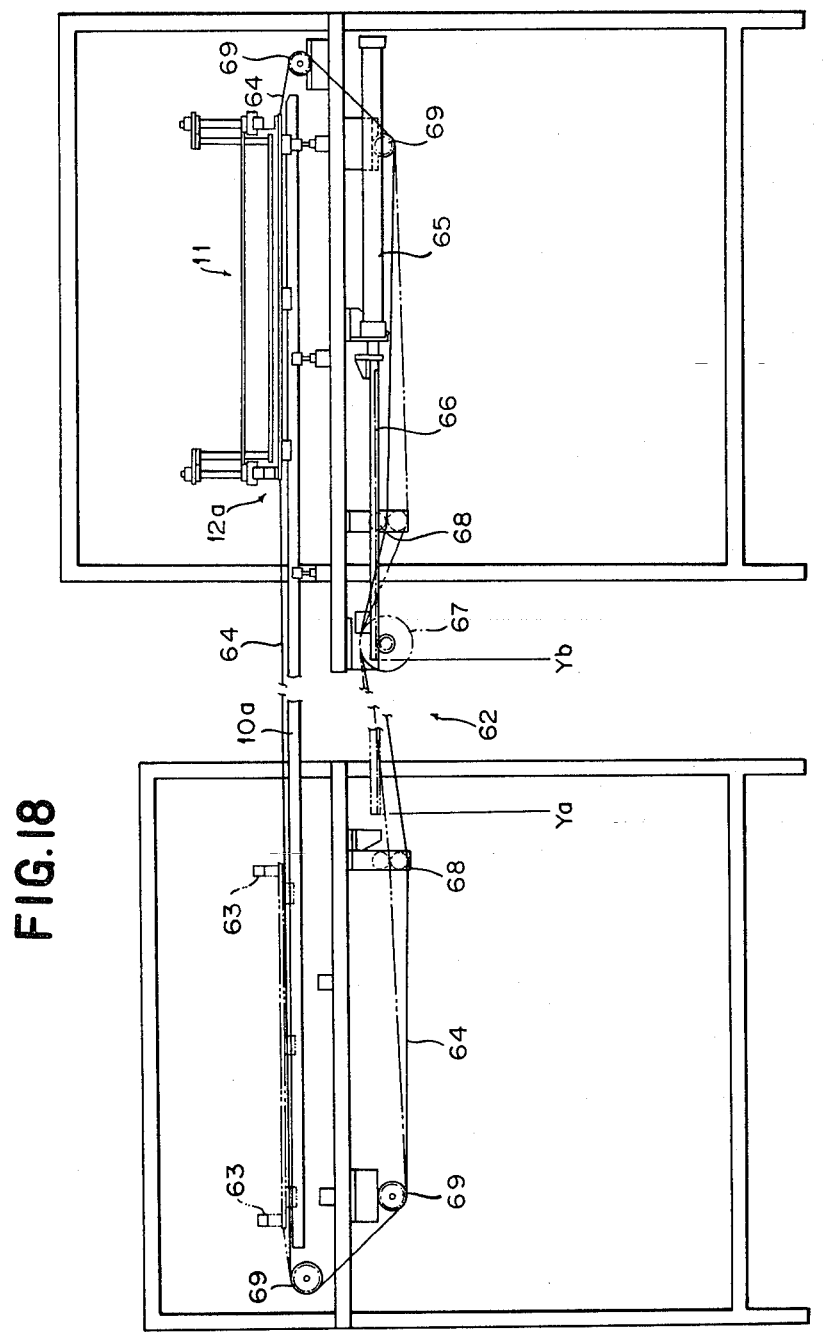

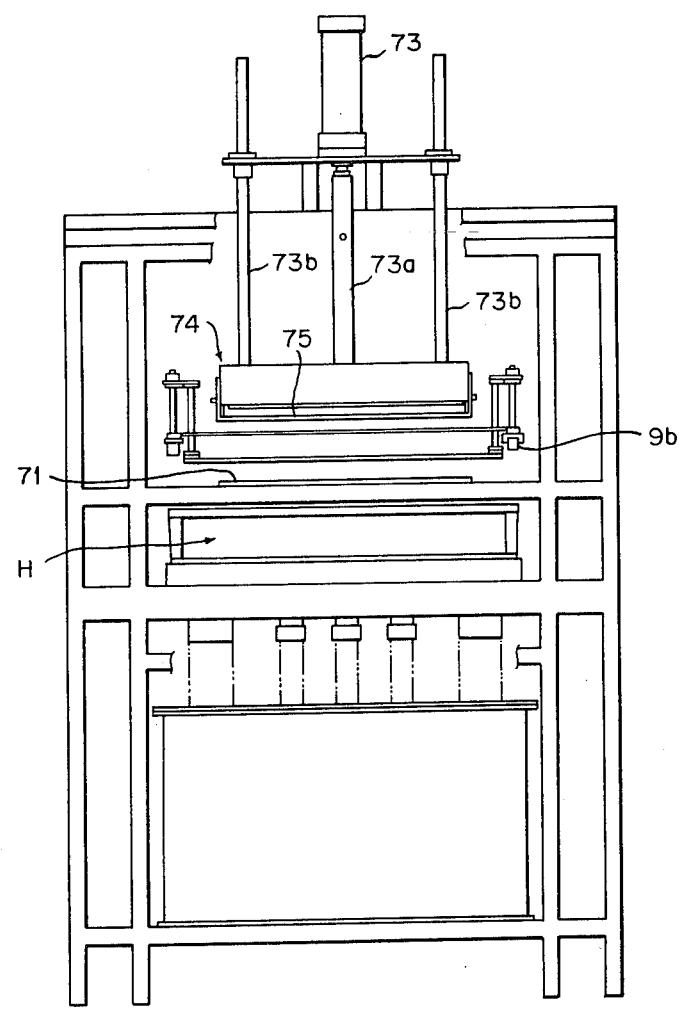

AUTOMATIC PLATING APPARATUS

BACKGROUND OF THE INVENTION

The present invention relates to an apparatus for automatically plating a plurality of objects in the form of strips which are supported in alignment. In plating objects such as IC lead frames, it is known to shape the object to be plated into a coil, which is conveyed over an automatic plating line for continuous plating operation. It is also known to cut the objects in advance into strips and to send them over the automatic plating line for plating. In the latter apparatus, however, a large number of strips of objects must be treated concurrently at a time and it is necessary to develop a conveying means and matching plating steps to meet the requirements. So far as the inventors of the present invention know, there has been no such apparatus that can effectively carry out an automatic plating of a large number of objects in the form of strips at a time.

SUMMARY OF THE INVENTION

The present invention has been conceived in response to such requirements and relates to an automatic plating apparatus and, more particularly, it aims to provide a plating apparatus to efficiently carry out the plating operation by supporting a plurality of objects to be plated in alignment in a support carriage prior to the treatment. In other words, it aims to provide an automatic plating apparatus which is capable of continuous performance of batchwise plating.

Another object of the present invention is to provide an apparatus for automatically performing pre-treatment, plating and after-treatment with the employment of a plating assembly line incorporated into a rectangular circuit, when viewed in plan view, and a support carriage for the objects to be plated being conveyed over the assembly line.

Still another object of the invention is to provide an automatic plating apparatus on an assembly line of rectangular circuit which is provided with a lateral conveyer line to send the support carriage for the objects to be plated from a first plating line on one side to a second plating line on the other in a direction normal to said lines.

Still another object of the present invention is to provide an automatic plating apparatus which is provided with a means for successively supplying the objects to be plated into a plurality of support carriages, said means acting also as a means to successively remove said objects from the support carriages upon completion of plating.

Still another object of the present invention is to provide an automatic plating apparatus comprising support carriages which are capable of lowering and determining the positions of the objects to be plated in accordance with and with respect to the types of plating steps carried out in each plating tank installed on the plating lines.

These and other objects and features of the present invention will be better understood from a consideration of the following description taken in connection with the accompanying drawings of FIGS. 1 through 22 wherein one embodiment is illustrated by way of example.

BRIEF DESCRIPTION OF THE DRAWING

FIG. 15 is a diagrammatic oblique view of the forwarding pressure means;

FIG. 18 is a front view of a lateral conveyer line seen from the arrow XVIII of FIG. 1;

FIG. 20 is an enlarged front view of the apparatus of FIG. 19 taken along the line XX—XX:

DETAILED DESCRIPTION OF THE PREFERRED EMBODIMENTS

The description of the apparatus will now be made referring to the appended drawings.

Figure 1:
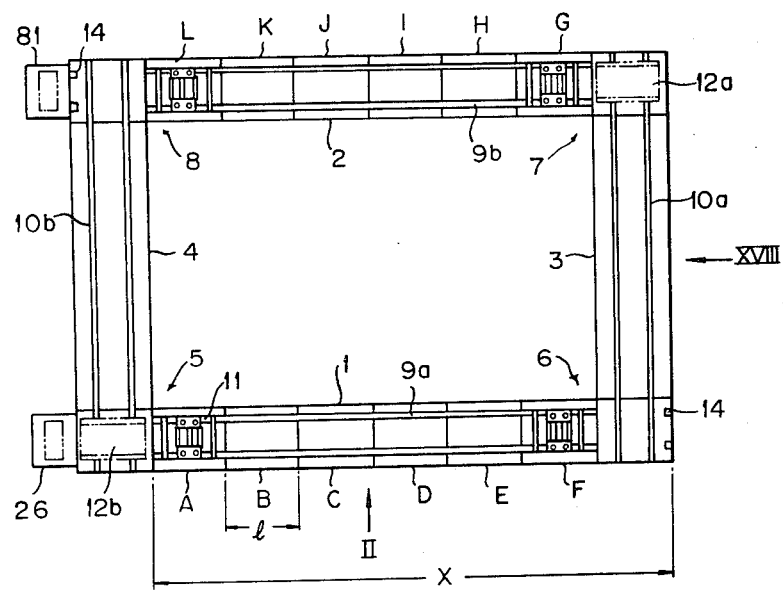
FIG. 1 is a diagrammatic plan view of plating assembly lines of the automatic plating apparatus according to the present invention.

As shown in FIG. 1, the automatic plating apparatus is so designed that the assembly line is incorporated into a circuit having a rectangular shape in a plan view. In the drawings, the reference numeral 1 denotes the first plating line, 2 the second plating line, 3 and 4 the lateral conveyer lines, 5 and 6 an inlet side and an outlet side respectively of the first line, and 7 and 8 an inlet and an outlet side respectively of the second plating line.

The first and the second plating lines 1 and 2 are in parallel and a pair of rails 9a and 9b for each line extend over the plating tanks. Reference numerals 10a and 10b denote the rails for the lateral conveyer lines 3 and 4 respectively. There are located on the first plating line 1, starting from the inlet side 5 toward the outlet side 6, a location A for the step of supplying the objects to be plated, a tank B for degreasing step, a water rinse tank C, an activation tank D, a water rinse E and a strike plating tank F in succession while on the second plating line, also from the inlet side 7 to the outlet side 8, a water rinse tank G, a partial plating tank H, an exfoliation tank I, a water rinse tank J, a hot water rinse tank K and a location L for the step of removing objects that have been plated.

Support carriages 11 for the objects to be plated are also provided on the rails 9a and 9b and are located above the plating tanks. Support carriages are also mounted on the lateral carriage 12a of the lateral conveyer line 3 and the lateral carriage 12b of the lateral conveyer line 4 respectively.

At the inlet sides 5 and 7 of the first and the second plating lines 1 and 2, a forwarding pressure means 13 is provided to push the support carriage 11 for the objects to be plated. A positioning means 14 for the support carriage 11 is also provided at the outlet sides 6 and 8 of the first and the second plating lines 1 and 2 respectively.

A vacuum device 16 is provided at the inlet side 5 of the first plating and 1 and at the outlet side 8 of the second plating line 2, respectively, to supply and remove the objects.

Figure 4:
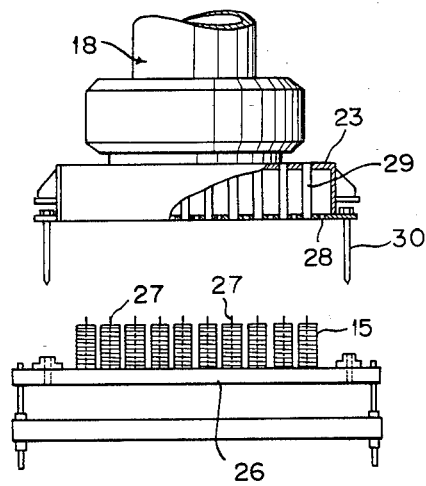
FIG. 4 is a diagrammatic partial front view illustrating relative positions of the suction box of the vacuum device and the objects to be plated.
Figure 2:
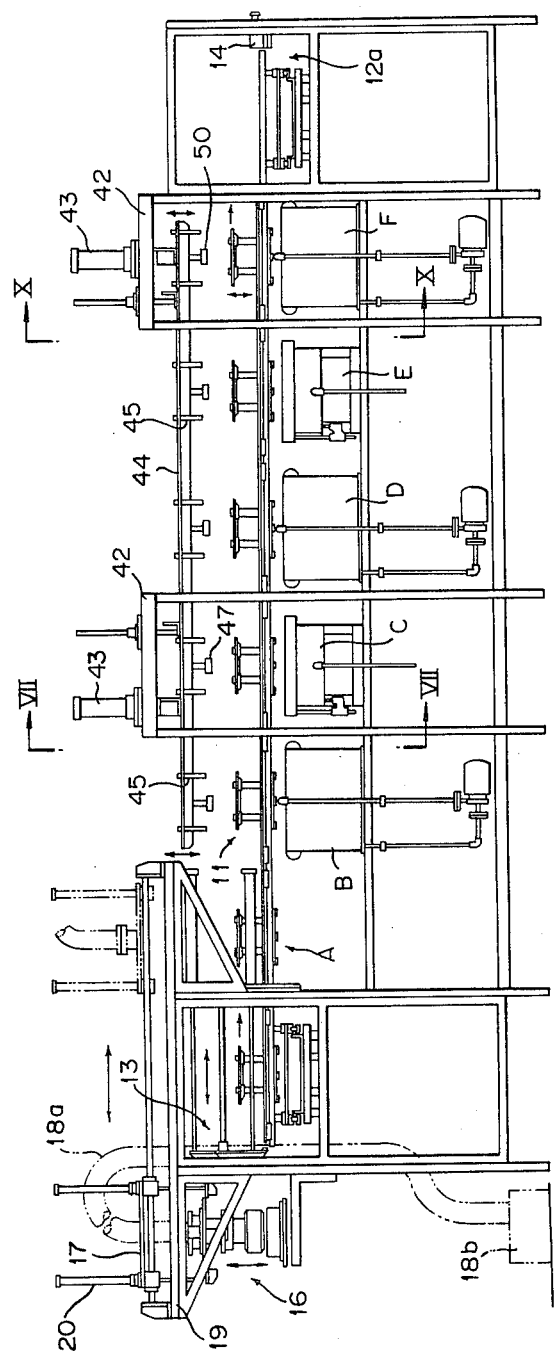
FIG. 2 is a side view of the first plating line seen from the arrow II of the FIG. 1.
Figure 3:
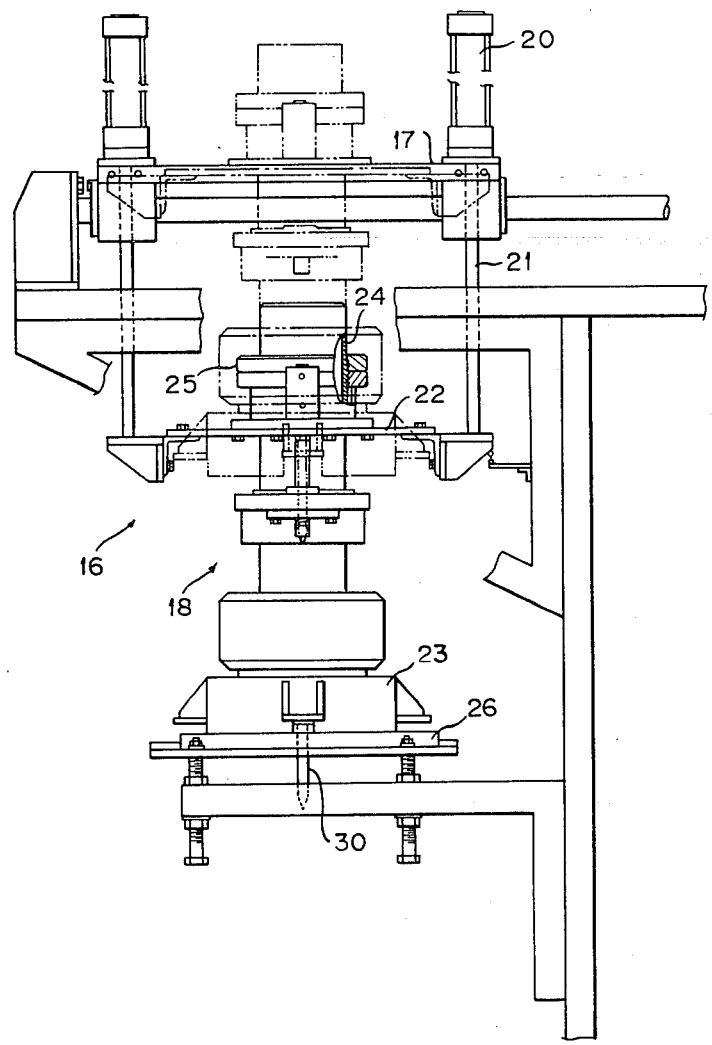
FIG. 3 is a side view illustrating the main parts of the vacuum device.

Referring now to FIGS. 3 and 4, the vacuum device 16 will be explained. The vacuum device 16 comprises primarily a carrier 17 in the form of a frame and a tubular member 18 which is suspended from the carrier 17. The carrier 17 is made movable freely by a means (not shown) on the frame 19 to the right and the left in FIG. 3. The tubular member 18 is connected to a suction device 18b by means of a flexible duct 18a at its upper end (see FIG. 2) supported in the middle by a supporting plate 22 which is attached to a rod 21 of the pressure cylinder 20 provided on the carriage 17. At its lower end, a suction and injection box 23 is attached. The box 23 is connected to a supply means for pressurized air (not shown). At the upper outer circumference of the tubular member is provided a screw 24 to which a support ring 25 is screwed to adjust the lowermost position and which is supported by said supporting plate 22. The support ring 25 adjusts the lowermost position of said box. Pins 27 are provided on a table 26 on which are mounted a plurality of strips of objects to be plated 15, for example, an IC lead frame obtained from a thin metal plate treated for press or etching treatment. There are provided at the bottom of said box 23 suction holes 28 and through holes 29 to receive said pins 27 and at its side are the pins 30 suspended therefrom to determine descending position.

As shown in FIG. 4, the tubular member 18 will descend by means of the support plate 22 and the support ring 25 in accordance with the degree of the action of the pressure cylinder 20. The box 23 will come in direct contact with the objects 15 to be plated which are placed on the table 26, whereupon the objects 15 to be plated will be suctioned toward the suction hole 28 of the box 23 when vacuum is applied through the tubular member 18. The object 15 to be plated will then ascend as it is suctioned and move toward the right in FIG. 3. The box 23 will be lowered again by the pressure cylinder 20 to introduce the objects 15 into the support carriage 11. The objects 15 to be plated will be easily removed from the bottom of the box 23 by introducing pressurized air to said box 23 at this point, converting the suction hole 28 into an injection hole instead.

Figure 5:
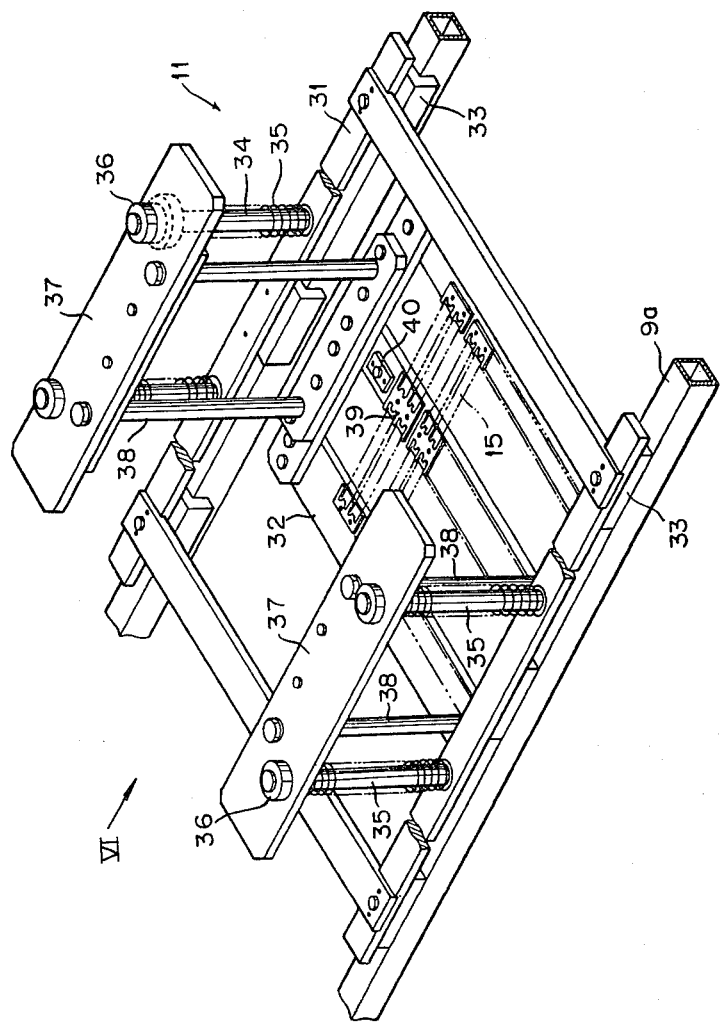
FIG. 5 is an oblique view of a support carriage for the objects to be plated.
Figure 6:
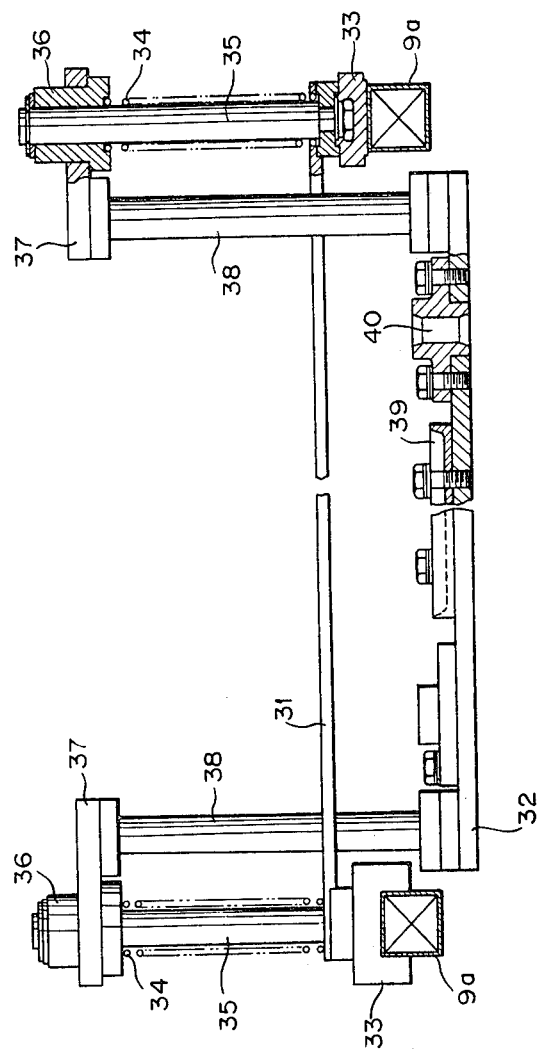
FIG. 6 is a front view taken from the direction of the arrow VI of FIG. 5.

The support carriage 11 for the objects to be plated will be described with reference made to FIGS. 5 and 6. The support carriage 11 mainly comprises a carrier base 31 in the form of a frame and a rack base 32 suspended therefrom. The carrier base 31 is provided with a slider 33 at its bottom to be engaged with the rail 9a and a standing bar 35 having a spring 34 fixed thereto is provided on the upper surface of the carrier base 31. The rack base 32 is suspended and retained within the frame of the carrier base 31 by means of a movable bush 36, a bush plate 37 and suspension bars 38. The rack base 32 will descend vertically by an external pressure and ascend to restore its original position by the resilience of the spring 34 by itself when the pressure is released. The rack base 32 is provided with holders 39 at the crossing sides of the rack base to align and support a plurality of objects 15 to be plated and a guide hole 40 as a means to determine the descending position.

A pressure means 41 to determine the descending position is provided on the first plating line 1 in order to simultaneously force each of the rack bases 32, carrying objects 15 to be plated thereon and being provided on the support carriage 11, into each of the plating tanks (B-F) to a predetermined depth. The pressure means 41 comprises, as shown in FIG. 2, a pressure cylinder 43 provided on a frame 42, an elongated pressure frame 44 provided on the rod of the pressure cylinder 43 and the pressure rods 45 extending downwardly from the pressure frame 44 at a position directly above each plating tank (B-F). The pressure rods 45 are lowered by the pressure frame 44 by means of the pressure cylinder 43 to abut with the upper surface of the bush plates 37 for the support carriage 11 for the objects 15 to be plated to eventually force the rack base 32 downwardly against the force of the springs 34.

Figure 7:
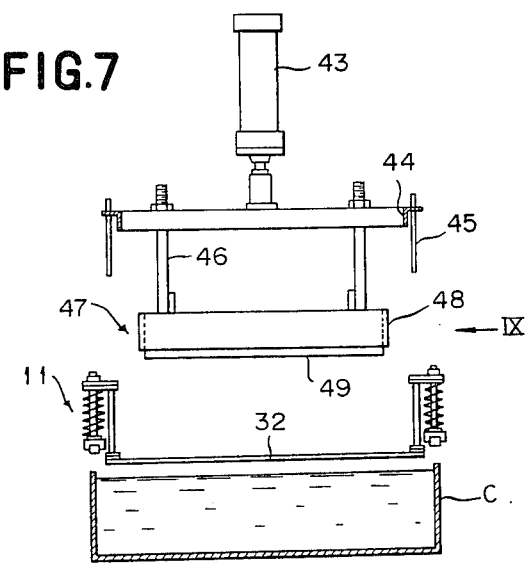
FIG. 7 illustrates a diagrammatic front view of the apparatus taken along the line VII—VII of FIG. 2.
Figure 8:
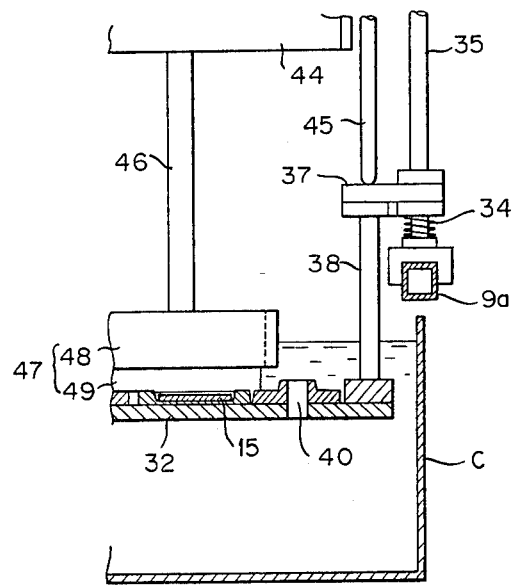
FIG. 8 is a view illustrating the operation of the apparatus of FIG. 7.
Figure 9:
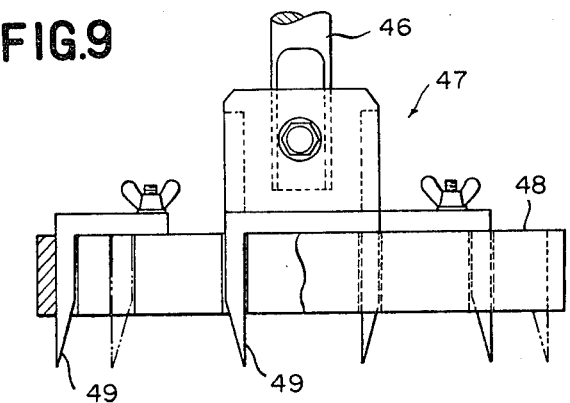
FIG. 9 is an enlarged front view of the holding member shown in FIGS. 7 and 8 seen from the arrow IX of FIG. 7.
Figure 10:
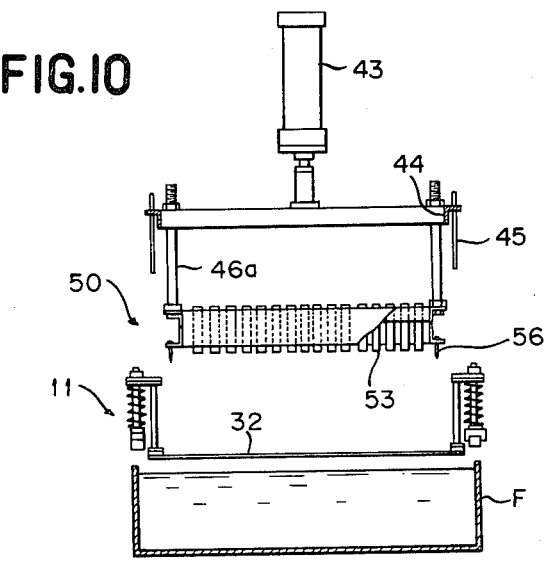
FIG. 10 is a diagrammatic front view of the apparatus taken along the line X—X of FIG. 2.

Referring now to FIGS. 7 through 9, the water tank C for rinsing is explained. The holding member 47 is fixed to the pressure frame 44 by means of suspension bars 46, and the holding member 47 is provided with a plurality of pressure ribs 49 adjustably attached to the frame base 48. The pressure ribs 49 are non-conductive and come in contact with the upper surface of the objects 15 to be plated as they descend. That is, as can be seen in FIG. 8, when the pressure frame 44 descends, the pressure rods 45 and the holding member 47 will inevitably descend in correspondence with the movement of the pressure frame 44. The former presses down and positions the rack base 32 with the objects 15 to be plated into the plating tank C, while the latter prevents the objects 15 to be plated from falling off from the rack base 32 (more precisely, the holder 39) as it presses the upper surface thereof. This description concerning FIGS. 7 through 9 is not limited only to the water tank C for rinsing but will apply to all of the plating tanks for dip platings wherein no electricity charge is necessary.

Figure 11:
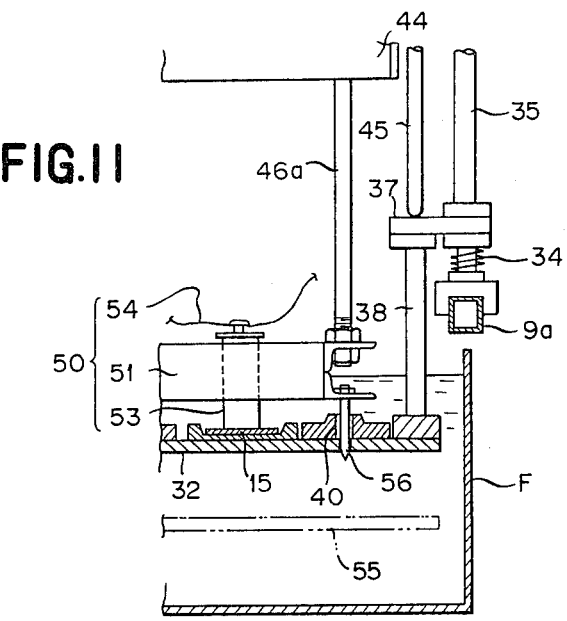
FIG. 11 is a view to explain the operation of the apparatus shown in FIG. 10.
Figure 12:
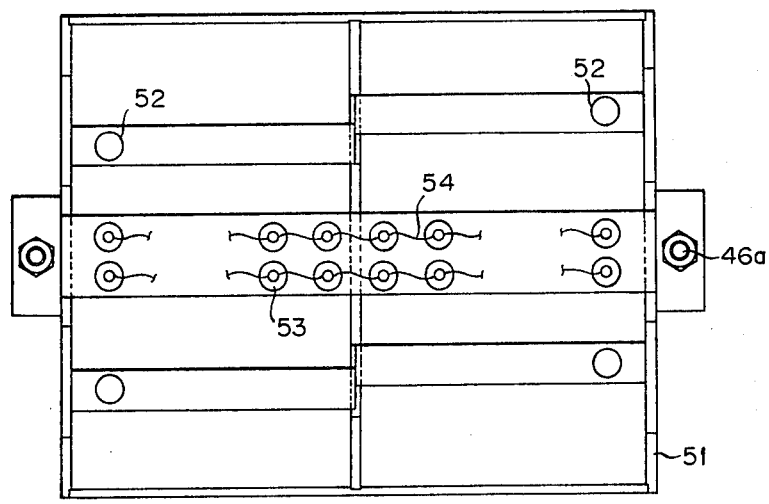
FIG. 12 is a plan view of the holding member shown in FIGS. 10 and 11.
Figure 13:
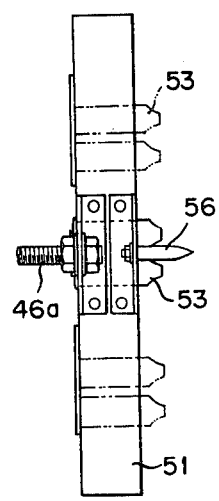
FIG. 13 is a side view of the holding member shown in FIG. 12.
Figure 14:
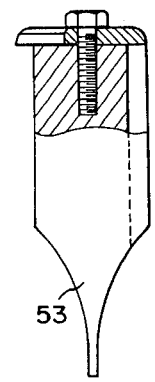
FIG. 14 shows a front view of the weight member.

Referring to FIGS. 10 through 14, plating procedures requiring electricity charge such as electrolytic degreasing or overall strike plating etc. will be described. The holding member 50 is attached to the lower end of the suspension bars 46a provided on the pressure frame 44, and the holding member 50 is provided with a plurality of weights 53 of conductive material which are inserted in the through holes 52 formed on the frame base 51. The lead wire 54 extends over the weights 53. On the other hand, in the strike plating tank F is provided an anode 55. As shown in FIG. 11, when the pressure frame 44 is pressed downwardly, the pressure rod 45 and the holding member 50 will be pressed downward in accordance with the pressure frame, the former pressing the rack base 32 together with the objects 15 to be plated into the plating tank F, while the latter causes the lower surfaces of the weights 53 of the holding member 50 to abut with the upper surfaces of the plurality of the objects 15 to be plated. The electricity is charged in this state to perform desired electrolysis. In order to allow the weights 53 and the objects 15 to come in secure contact, pins 56 are suspended from the side of the holding member 50, and the pins 56 prevent the errors in plane-wise positioning by engaging with the guide holes 40 of the rack base 32.

Figure 16:
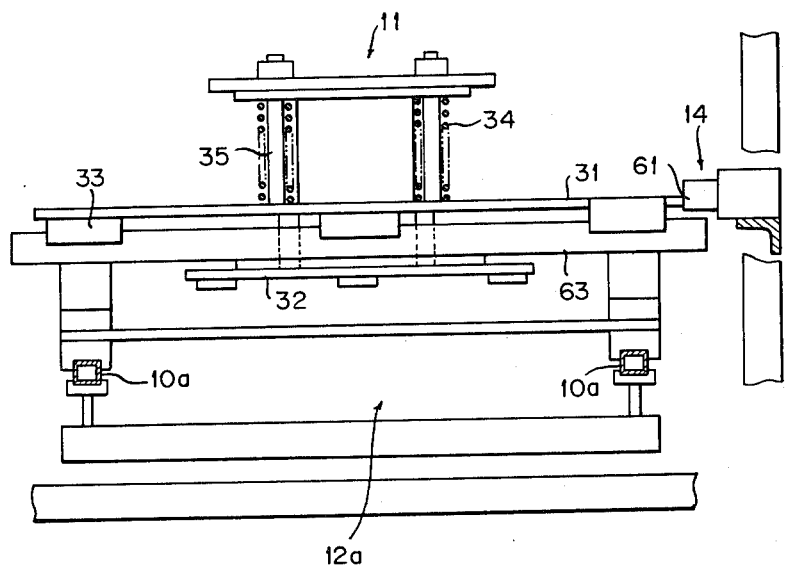
FIG. 16 is a side view of a positioning means.

The plating processes in the apparatus of FIGS. 7 through 9 and 10 through 14 are conducted at the same time by lowering the common pressure frame 44. For this purpose, the support carriages 11 for the objects 15 need to move on the rail 9a and stop at predetermined positions accurately. A means to allow exact positioning and the movement of the support carriage 11 is provided, which is shown in FIG. 15 and FIG. 16.

FIG. 15 illustrates the forwarding pressure means 13 which is provided at the inlet side 5 of the first plating line 1. A similar device is provided at the inlet side 7 of the second plating line 2, description thereof being omitted here. The forwarding pressure means 13 comprises a pressure cylinder 57 and a movable plate 58 attached to the tip of the rod. The movable plate 58 is in contact with the end portion 59 of the carrier base 31 of the support carriage 11 for the objects to be plated which is located on the lateral carriage 12b, and forces the support carriage 11 from the lateral carriage 12b into the rail 9a on the first plating line. In the drawing, reference numeral 60 denotes a guide bar.

The length of the carrier base 31 is predetermined to correspond with the distance of the plating process and the length l of the plating tank (see FIG. 1). Therefore, as a new carriage is forced into the line by means of the said movable plate 58 where each carriages 11 is arranged above each of the plating tanks (B–F), the carriages proceed to the next process by one step, namely by the length l, and the support carriage 11 at the outlet side of the plating line will be forced onto the lateral carriage 12a located there. Thus, the first plating line 1 will be filled with support carriages 11 for the distance of one block X (cf. FIG. 1), and a positioning means 14 is employed to accurately position each of the carriages with respect to each plating tanks (B–F), as shown in FIG. 16.

As the positioning means 14, a pressure cylinder with cushion is employed so that the position will be adjusted minutely by receiving the tip 61 of the carrier base 31 of the first support carriage 11 on line, absorbing the forwarding pressure caused by the pressing and forwarding of the carriage by means of the movable plate 58 and at the same time pushing back all the carriages.

Springs, air cushions and the like can be employed as the positioning means 14 instead of the pressure cylinder with cushion as used here.

Figure 17:
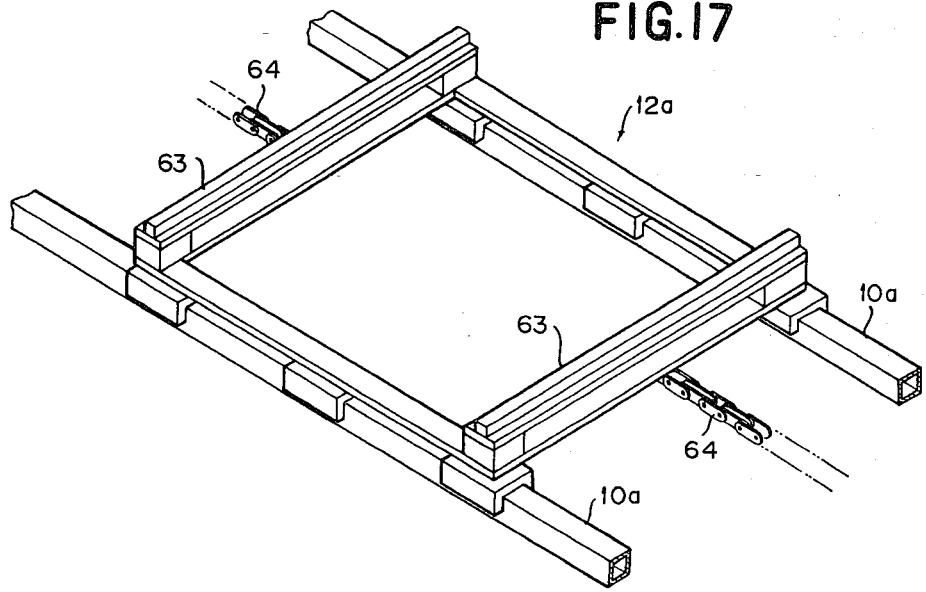
FIG. 17 is an oblique view of a lateral carriage.
Figure 19:
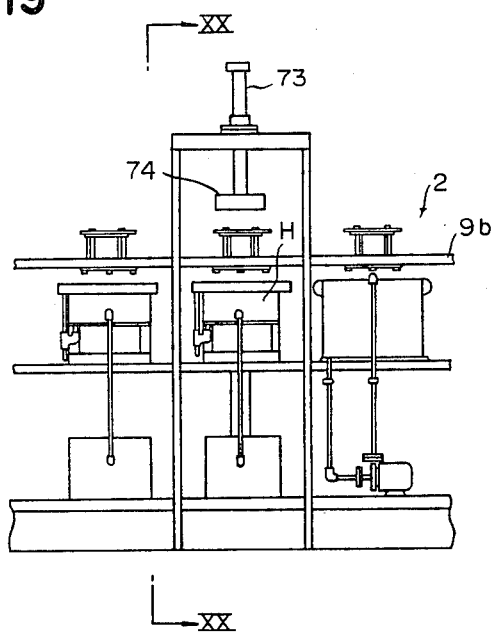
FIG. 19 shows a diagrammatic side view of an apparatus for partial plating.
Figure 21:
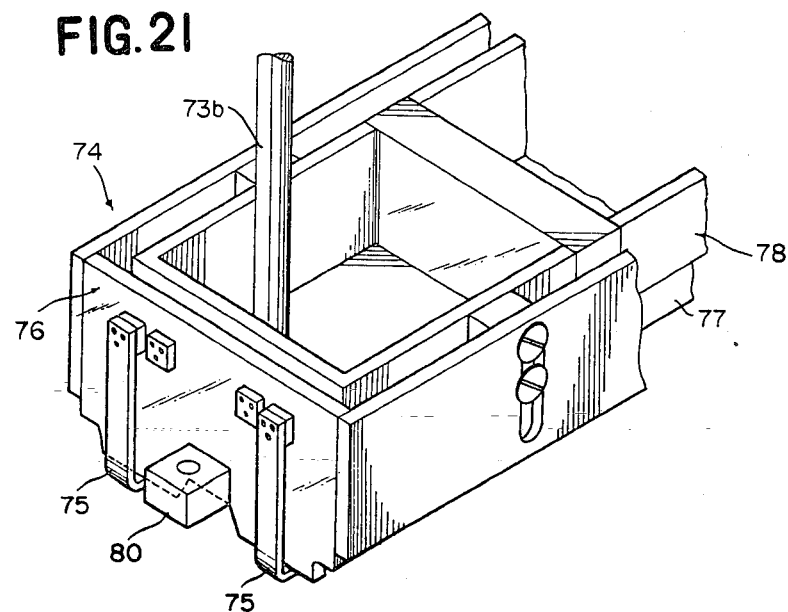
FIG. 21 is a partial oblique view of a holding member.

The lateral conveyer line 3 will be explained with reference to FIGS. 17 and 18. As the other lateral conveyer line 4 is substantially the same as the line 3, the description thereof is omitted. The conveyer line 3 is provided with a lateral rail 10a which carries the lateral carriage 12a and a conveyer means 62. The lateral carriage 12a comprises a pair of rails 63 for the support carriage 11 and the ends of a driving chain 64 is attached to the sides thereof. As the conveyer means 62, a pressure cylinder 65, a rod with the rack 66, a sprocket 67 coaxial with the pinion, a tension sprocket 68 and a guide sprocket 69 are used, and a driving chain 64 is extended about a group of sprockets. The sprocket 67 will rotate by the action of the pressure cylinder 65, to move the chain 64 so that the lateral carriage 12a carrying the support carriage 11 thereon will move from the outlet side 6 of the first plating line 1 to the inlet side 7 of the second plating line and from the outlet side 8 of the second plating line to the inlet side 5 of the first plating line 1. Conversely, in order to position the lateral carriage 12a at the outlet side 6 of the first plating line 1, the rod 66 of the pressure cylinder 65 is shifted from the point Ya to the point Yb of FIG. 18, the sprocket 67 coaxial with the pinion is rotated clockwise, the driving chain 64 is moved to the right direction in FIG. 18 and the lateral carriage 12a located at the inlet side 7 of the second plating line 2 is transferred to the left direction in the drawing together with the movement of the driving chain 64. Thus, the carriage 12a will be positioned at the inlet side 6 of the first plating line 1.

Because of the provision of the forwarding pressure means 13 shown in FIG. 15, the support carriage 11 for the objects to be plated will be transferred to the line 2 in the manner described above at the inlet port 7 of the second plating line 2.

The partial plating process on the second line 2 will now be described referring to the FIGS. 19 through 22. Other after-treatment such as water rinsing, hot water rinsing and the like other than the partial plating can be performed in a manner similar to the one described with respect to the drawings of FIGS. 7 through 14 and the description of the apparatus therefor is omitted.

Figure 22:
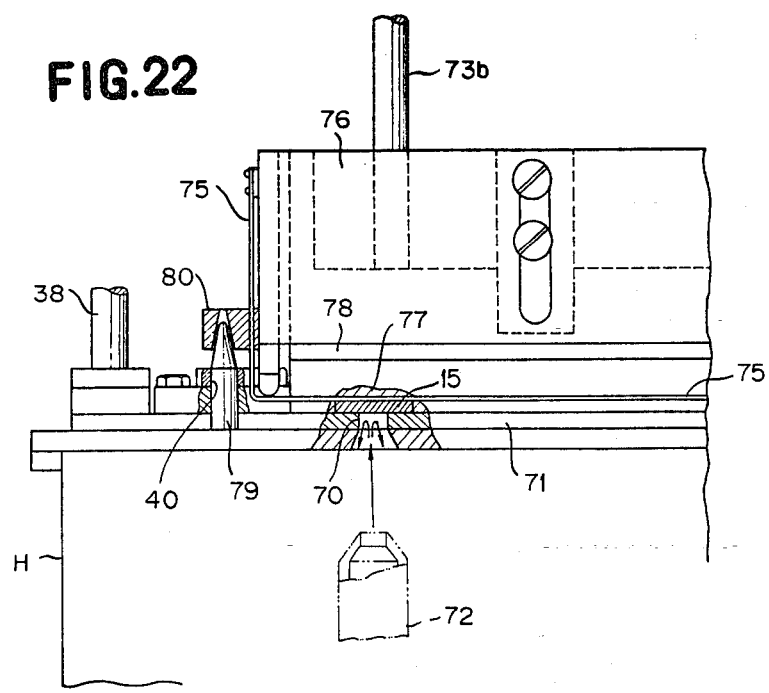
FIG. 22 is a view to illustrate the operation of the holding member of FIG. 21.

An aperture 70 for injection is provided on the first mask 71, which is provided on the upper surface of the partial plating tank H. Plating liquid can be injected at will from the nozzle 72 which acts also as an anode (refer to FIG. 22). At the upper portion thereof, a pressure body 74 provided at the lower end of the pressure rod 73a of the pressure cylinder 73 is arranged together with the guide rod 73b. The pressure body 74 comprises a case 76 in the form of a band provided with lead wires 75 and a pressure main body 78 provided with a second mask 77 at its lower end. At the upper surface of the partial plating tank H, positioning pins 79 are projecting (refer to FIG. 22) while positioning bush 80 is provided to the case 76. The pressure cylinder 73 pushes the pressure main body 78 and the case 76 downwardly so that the lead wire 75 comes in contact with the upper surface of the object 15 to be plated and, then, the whole area of the object will be masked by the second mask 77 while being pushed downwardly together with the rack base. Then, as shown in FIG. 22, the lower surface of each of the objects 15 will be positioned to a place corresponding to the aperture 70 for the injection in the first mask. The plating liquid will be injected in this state to perform the partial plating.

The support carriage 11 supporting the aligned objects that have been subjected to all the plating processes will now move toward the outlet side 8 of the second plating line 2, and prior to changing over to the lateral carriage 12a at the outlet side 8 by the forwarding pressure means 13 in a manner described above (refer to FIG. 15), the object 15 will be suctioned by the vacuum device (refer to FIGS. 3 and 4) and removed onto a table 81. The emptied support carriage 11 will then be conveyed to the inlet side 5 of the first plating line 1 by the lateral carriage to resume continuous operation on the plating assembly line which is incorporated into a circuit to perform desired plating.

As has been described above, the plating assembly line of the apparatus according to the present invention is incorporated into a circuit having a rectangular shape and comprises different plating tanks successively provided thereupon. The support carriages for the objects to be plated are conveyed by a lateral carriage to change over to another plating line by means of a forwarding pressure means from the inlet side of the first and the second plating lines. The objects having been plated will be sequentially removed from the support carriage by a vacuum device, and the support carriage devoid of objects will be loaded with a fresh batch of objects introduced by another vacuum device, thus enabling a continuous performance of batchwise plating operations, to effectively carry out a plating of a large number of strips of objects automatically.

Further, the present invention enables, by the employment of the lateral conveyer lines, the support carriages carrying a plurality of objects to be sent over to a second plating line running parallel to the first plating line by a laterally conveying line which forms a rectangular circuit of plating lines. The lateral carriage effectively conveys the support carriages by means of a group of sprockets including the driving sprocket and the chain which stretches around said sprockets.

On top of these advantageous effects of the present invention, the support carriage 11 for the objects to be plated, in this invention, can be freely brought into abutment with the upper surface of the plating tanks or to be dipped into the plating tanks so that the present apparatus can be applicable extensively to assembly lines with various combinations of plating tanks. Therefore, the present invention greatly contributes for design freedom of the plating assembly line. Moreover, since the positions of the holders for the objects can be precisely and finely adjusted, the apparatus according to the invention becomes easier to handle.

Still further, because of the vacuum device, the support carriage can move back and forth freely on the frame by means of the forwarding means and the tubular member is supported in "a freely movable state" against the support plate provided at the lower end of the rod of a pair of pressure cylinders attached to the carriage. The overall construction of the apparatus is thus simple, and even if the position of the object to be injected with the plating liquid and suctioned by the vacuum device is changed, the injection and suction box attached to the lower end of the tubular member may well adjust the position thereof in correspondence to said change. The suction box which acts also as the injection box is provided with a pin which determines the lowermost position thereof, thereby enabling a precise positioning. The suction and injection or introduction and setting of objects can be effectively conducted since the apertures bored for such purposes on the box can be adjusted to a predetermined positions relative to that of the objects to be plated which have been aligned beforehand. A supply source of pressurized air may be connected to the suction-injection box to render the vacuum device the role not only as the vacuum device but also as a means to release the suctioned objects at the time of setting the same at the predetermined position for plating. This way, an object can be easily removed from the suction box and set to a predetermined position even if it adheres to the suction box on account of wet surface.

What we claim:

1. A plating apparatus, comprising:

a first plating line comprising a first series of treating tanks arranged in a line, said first plating line having an inlet end and an outlet end;

a second plating line comprising a second series of treating tanks arranged in a line, said second plating line being substantially parallel with and laterally spaced from said first plating line, said second plating line having an inlet end and an outlet end, the outlet end of said first plating line being laterally aligned with the inlet end of said second plating line and the outlet end of said second plating line being laterally aligned with the inlet end of said first plating line;

a first, linearly movable conveyor extending laterally from the outlet end of said first plating line to the inlet end of said second plating line;

a second, linearly movable conveyor substantially parallel with said first conveyor and extending laterally from the outlet end of said second plating line to the inlet end of said first plating line;

said first plating line, said second plating line and said first and second conveyors forming a closed circuit which is substantially rectangular in plan view;

a first pair of parallel, elongated, laterally spaced rails disposed above said first series of treating tanks and extending from the inlet end to the outlet end of said first plating line;

a second pair of parallel, elongated, laterally spaced rails disposed above said second series of treating tanks and extending from the inlet end to the outlet end of said second plating line;

a plurality of support carriages, said support carriages being mounted on said rails for lengthwise movement therealong, said support carriages in each of said plating lines being in end-abutting-end relationship and being located at positions corresponding to the positions of said treating tanks, said support carriages including means for holding the objects to be plated so that said objects can be inserted into said treating tanks and can be removed from said treating tanks;

first, intermittently operable, forwarding means adjacent to the inlet end of said first plating line, second, intermittently operable, forwarding means adjacent to the inlet end of said second plating line, each of said forwarding means being engageable with a support carriage at the inlet end of its associated plating line for pushing the latter support carriage lengthwise of its associated plating line a distance equal to the width of one tank and thereby effecting intermittent, stepwise movement of said support carriages along the rails of its associated plating line when said objects are removed from said treating tanks so that said support carriages are moved from a position above one of said tanks to a position above the next following tank whereby said support carriages are intermittently moved along the respective plating lines from the inlet end to the outlet end thereof;

a laterally movable transport carriage on each of said conveyors, said transport carriage being movable between said plating lines, and means on said transport carriage for receiving a support carriage discharged from the outlet end of one of said plating lines and moving said support carriage to the inlet end of the other plating line;

positioning means at the outlet ends of said first and second plating lines for accurately positioning the support carriages with respect to said tanks;

a first, vacuum, feed device adjacent to the inlet end of said first plating line for feeding objects to be plated onto a support carriage located thereat; and a second, vacuum, discharge device adjacent to the outlet end of said second plating line for removing plated objects from the support carriage located thereat.

2. The plating apparatus as claimed in claim 1 in which said support carriages each comprise a rack base for holding the objects to be plated, said rack base being vertically movable with respect to said tanks, and including first pressure means associated with the first plating line for forcing the rack bases of the support carriages in said first plating line downwardly into said tanks of said first plating line and to position said rack bases in said tanks and second pressure means associated with the second plating line for forcing the rack bases of the support carriages in said second plating line downwardly into said tanks of said second plating line and to position said rack bases in said tanks.

3. The plating apparatus as claimed in claim 1 or claim 2 wherein said first and second conveyors each comprise:

guide rails extending perpendicular to the first and the second plating lines;

said transport carriage being movably supported on said guide rails and being provided with support rails for supporting a support carriage, said support rails on said transport carriage being mounted on the upper end of said transport carriage at positions corresponding to the positions of the rails of the first and the second plating lines so as to be longitudinally alignable therewith, sliders mounted on the lower end of said transport carriage and slidably engaging said guide rails; and drive means comprising a group of sprockets including a driving sprocket and a chain extending over said sprockets, said chain being connected to the opposite ends of said transport carriage so that said transport carriage is moved back and forth along said guide rails in response to back and forth movement of said chain.

4. The plating apparatus as claimed in claim 1 or claim 2 wherein said vacuum devices each comprise:

a frame, a frame carrier mounted on said frame for movement toward and away from its associated plating line;

a pair of pressure cylinders provided on said frame carrier, said cylinders having vertically movable rods;

a support plate attached to the lower ends of the vertically movable rods of said pressure cylinders;

a tubular member, a flexible duct connected to the upper end of said tubular member, said duct being alternatively connectible to a suction source and a pressure source, said tubular member extending through said support plate;

ring members screwed onto an outer circumferential screw portion of said tubular member above said support plate, said ring members being supported by the support plate so that the lowermost position of said tubular member can be adjusted; and a box having pins projecting downwardly from its sides for determining the lowermost position of said box, said box having a plurality of apertures in its lower surface, said box being attached to the lower end of the tubular member so that when suction is applied to said tubular member objects can be picked up by said box and when pressure is applied to said tubular member objects can be discharged from said box.

5. The plating apparatus as claimed in claim 1 or claim 2 wherein said support carriage for the objects to be plated comprises:

a carrier base;

a rack base in the form of a frame suspended from said carrier base and which descends in response to an external pressing force and ascends to its upper position when said external pressing force is released;

said carrier base comprising sliders on its opposite sides for engaging said rails above said lines of tanks, upstanding bars extending upwardly from said sliders, each of said bars having a movable bush at its upper end and a spring interposed between the slider and the bush;

said rack base being suspended between the sliders of the carrier base by means of suspension bars which are connected to the bushes, said rack base having cross bars having a plurality of holders for the objects to be plated, said holders being adjustable; and stop means for establishing the lowermost position of said rack base.

6. A plating apparatus, comprising:

a first plating line comprising a first series of treating tanks, said first plating line having an inlet end and an outlet end;

a second plating line comprising a second series of treating tanks, said second plating line being laterally spaced from said first plating line;

a first conveyor extending laterally between the outlet end of said first plating line and the inlet end of said second plating line;

a second conveyor extending laterally between the outlet end of said second plating line and the inlet end of said first plating line;

said first plating line, said second plating line and said first and second conveyors forming a closed circuit;

first rail means disposed above said first series of treating tanks and extending from the inlet end to the outlet end of said first plating line;

second rail means disposed above said second series of treating tanks and extending from the inlet end to the outlet end of said second plating line;

a plurality of support carriages for holding objects to be plated, said support carriages being mounted on said rail means for lengthwise movement therealong, said support carriages in each of said plating lines being located at positions corresponding to the positions of said treating tanks and including vertically movable means for holding the objects to be plated so that said objects can be inserted into said treating tanks and can be removed from said treating tanks;

first forwarding means adjacent to the inlet end of said first plating line, second forwarding means adjacent to the inlet end of said second plating line, each of said forwarding means being drivingly connectible with the support carriages in its associated plating line for effecting movement of said support carriages along the rail means of its associated plating line when said objects are removed from said treating tanks so that said support carriages are moved from a position above one of said tanks to a position above the next following tank whereby said support carriages are moved along the respective plating lines from the inlet end to the outlet end thereof;

a transport carriage on each of said conveyors, said transport carriage being movable between said plating lines, and means on said transport carriage for receiving a support carriage discharged from the outlet end of one of said plating lines and moving said support carriage to the inlet end of the other plating line;

positioning means at the outlet ends of said first and second plating lines for accurately positioning the support carriages with respect to said tanks;

a first, vacuum, feed device adjacent to the inlet end of said first plating line for feeding objects to be plated onto a support carriage located thereat; and a second, vacuum, discharge device adjacent to the outlet end of said second plating line for removing plated objects from the support carriage located thereat.

* * * * *